(12) United States Patent
Jones et al.

(10) Patent No.: US 6,876,675 B1
(45) Date of Patent: Apr. 5, 2005

(54) SYNCHRONIZATION IN OFDM SYSTEMS

(75) Inventors: Vincent K. Jones, Redwood Shores, CA (US); Michael Pollack, Cupertino, CA (US); Gregory G. Raleigh, El Granada, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/245,168

(22) Filed: Feb. 5, 1999

Related U.S. Application Data (60) Provisional application No. 60/074,331, filed on Feb. 6, 1998.

(51) Int. Cl.⁷ .................................................. H04J 3/06
(52) U.S. Cl. ...................... 370/509; 370/208; 370/210; 370/238; 375/260; 375/354
(58) Field of Search ................. 370/206, 208, 370/210, 238, 252, 503, 509, 510, 512, 513, 514, 511; 375/260, 354, 355, 363, 364

(56) References Cited

U.S. PATENT DOCUMENTS

| | | | | |
|---|---|---|---|---|
| 5,282,222 A | | 1/1994 | Fattouche et al. ............. 375/1 |
| 5,602,835 A | * | 2/1997 | Seki et al. .................. 370/206 |
| 5,625,651 A | | 4/1997 | Cioffi ........................ 375/354 |
| 5,732,113 A | * | 3/1998 | Schmidl et al. ............. 375/355 |
| 5,828,710 A | * | 10/1998 | Beale ........................ 375/344 |
| 5,909,470 A | * | 6/1999 | Barratt et al. ............... 375/324 |
| 6,097,776 A | | 8/2000 | Mesiwala ................... 375/355 |
| 6,208,695 B1 | * | 3/2001 | Klank et al. ................ 375/260 |
| 6,252,908 B1 | | 6/2001 | Tore .......................... 375/259 |
| 6,275,543 B1 | * | 8/2001 | Petrus et al. ............... 375/324 |
| 6,285,654 B1 | * | 9/2001 | Marchok et al. ........... 370/208 |
| 6,314,082 B1 | * | 11/2001 | Malmgren .................. 370/208 |
| 6,373,861 B1 | | 4/2002 | Lee ........................... 370/503 |
| 6,381,251 B1 | * | 4/2002 | Sano et al. ................. 370/509 |
| 6,459,679 B1 | | 10/2002 | Kim .......................... 370/208 |
| 6,501,730 B1 | | 12/2002 | Katsumoto ................. 370/208 |
| 6,546,055 B1 | | 4/2003 | Schmidl et al. ............ 375/244 |
| 6,549,592 B1 | * | 4/2003 | Jones ........................ 375/354 |

FOREIGN PATENT DOCUMENTS

| | | | | |
|---|---|---|---|---|
| EP | 0823804 A2 | | 11/1998 | .......... H04L/27/26 |
| JP | 7030513 | * | 1/1995 | ............ H04J/11/00 |

* cited by examiner

*Primary Examiner*—Dang Ton
*Assistant Examiner*—Shick Hom
(74) *Attorney, Agent, or Firm*—Ritter, Lang & Kaplan; Dan Lang; Dov Rosenfeld (57) ABSTRACT

Highly effective systems and methods for synchronizing OFDM receiver parameters to an OFDM transmitter are provided. These parameters may include carrier frequency, burst timing, and cyclic prefix length. These systems and methods incorporate special structural features into the OFDM signal to facilitate synchronization. In one embodiment, a supplemental cyclic prefix is added to an OFDM signal to facilitate synchronization. In an alternative embodiment, a synchronization burst with a periodic structure is used to facilitate synchronization. According to the present invention, synchronization may be maintained even if low cost analog oscillator components are used.

17 Claims, 8 Drawing Sheets

SYNCHRONIZATION IN OFDM SYSTEMS

STATEMENT OF RELATED APPLICATIONS

The present application is related to the subject matter of U.S. application Ser. No. 09/244,754; filed Feb. 5, 1999, (now U.S. Pat. No. 6,549,592; issued Apr. 15, 2003), entitled ENHANCED SYNCHRONIZATION BURST FOR OFDM SYSTEMS, co-filed and co-assigned with the present application.

This present application is related to and claims the benefit of U.S. Provisional Application No. 60/074,331, filed Feb. 6, 1998.

The contents of both related application are herein incorporated by reference for all purposes.

BACKGROUND OF THE INVENTION

The present invention relates to digital communication and more particularly to synchronization of certain parameters between a receiver and a transmitter.

In an OFDM (orthogonal frequency division multiplexing) communication system, data is communicated in a series of time domain bursts. To form each time domain burst, an IFFT is applied to a group of frequency domain symbols and a cyclic prefix is added to the transform result prior to transmission. Transmission may involve conversion to an analog signal, conversion to an intermediate frequency (IF), then upconversion to a desired selectable carrier frequency prior to final amplification and propagation across a transmission medium. Upconversion is typically achieved by mixing the IF signal with a variable frequency oscillator signal. The carrier frequency is varied by varying the oscillator frequency.

On the receiver end, preamplification is followed by downconversion to IF from the carrier frequency, again by mixing with a variable frequency oscillator. The resulting IF signal is typically converted to a baseband digital symbol sequence. The cyclic prefix is removed and an FFT is applied to recover the original frequency domain symbols.

For successful communications, certain parameters must be synchronized between the transmitter and the receiver. For example, the transmitter and receiver must have a common and precise shared understanding of the transmission frequency. In the exemplary system described above, this means that the variable frequency oscillators at the transmitter and receiver should be locked to each other. Imprecision with respect to the transmission frequency will cause inaccurate recovery of the OFDM symbols. To maintain system performance, it is desirable to always maintain frequency offset between the transmitter and receiver to within 1% of the spectral width occupied by a single frequency domain OFDM symbol.

When the receiver initially acquires the transmitter, it is desirable that the synchronization system tolerates and corrects a very wide misalignment between the transmitter and receiver oscillators. This allows the use of much lower cost analog components.

Also since OFDM communication proceeds on a burst by burst basis, the receiver and transmitter must agree on exactly when each burst begins. Again, the consequence of missynchronization will be lost data.

Additionally, the length of the cyclic prefix used by the transmitter will depend on the transmitter's understanding of the duration of the transmission channel's impulse response. This information may not necessarily be immediately available to the receiver in systems where the transmitter is a hub of a point to multipoint system. In these cases, the modulation parameters, including the cyclic prefix, may be programmable at the hub and each subscriber unit must "turn on" and acquire this OFDM modulation parameter. Upon acquisition, the receiver therefore must also determine the cyclic prefix length used by the transmitter.

SUMMARY OF THE INVENTION

By virtue of the present invention, highly effective systems and methods for synchronizing OFDM receiver parameters to an OFDM transmitter are provided. These parameters may include carrier frequency, burst timing, and cyclic prefix length. These systems and methods incorporate special structural features into the OFDM signal to facilitate synchronization. In one embodiment, a supplemental cyclic prefix is added to an OFDM signal to facilitate synchronization. In an alternative embodiment, a synchronization burst with a periodic structure is used to facilitate synchronization. According to the present invention, synchronization may be maintained even if low cost analog oscillator components are used.

A first aspect of the present invention provides a system for transmitting an OFDM signal via a channel to facilitate receiver synchronization. The system includes: a transforming stage that transforms a series of frequency domain data symbols into a burst of time domain symbols, and a cyclic prefix appending stage that appends to a beginning of the time domain burst a cyclic prefix duplicating a last segment of the time domain burst, wherein the cyclic prefix includes a first portion having length v wherein v is greater than or equal to an impulse response of the channel, and further includes a second portion after the first portion to facilitate receiver synchronization.

A second aspect of the present invention provides a system for transmitting an OFDM signal to facilitate receiver synchronization including: a synchronization burst generation stage that develops a frequency domain burst wherein periodically spaced frequency domain symbols of the burst have predetermined values and frequency domain symbols between the periodically spaced frequency domain symbols have null energy; and a transform processing stage that transforms the frequency domain burst into a time domain burst.

Other features and advantages of the invention will become readily apparent upon review of the following detailed description in association with the accompanying drawings.

DESCRIPTION OF SPECIFIC EMBODIMENTS

OFDM System Overview

Figure 1:
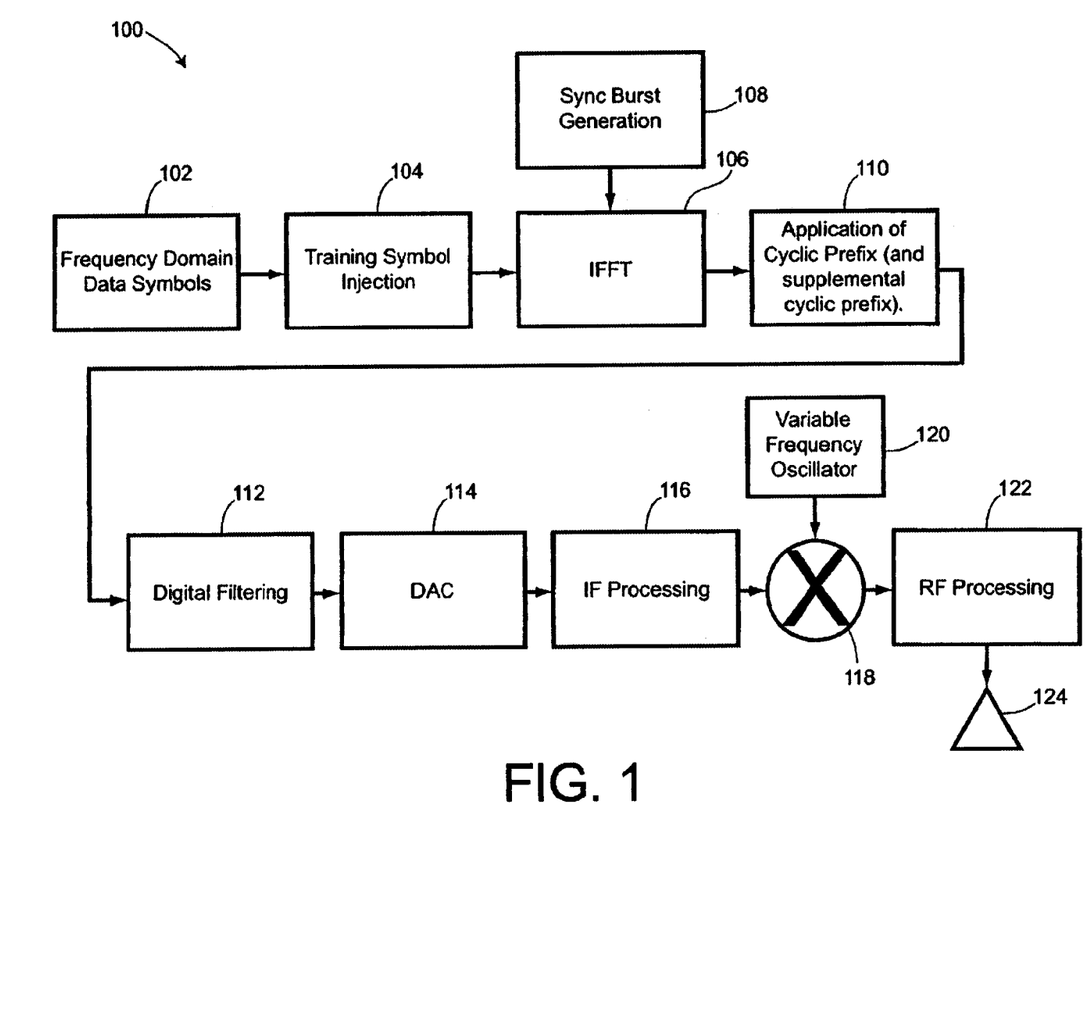
FIG. 1 depicts an OFDM transmitter system according to one embodiment of the present invention.

FIG. 1 depicts an OFDM transmitter system 100 according to one embodiment of the present invention. A source 102 originates data symbols to be transmitted in orthogonal frequency domain subchannels. Any channel coding technique or combination of techniques may be applied to the frequency domain data symbols. To assist in estimating characteristics of the channel, training symbols having known values may be interspersed with the data symbols by a training symbol injection system 104. The output of training symbol injection system 104 is a series of N-symbol frequency domain bursts where N is a length of an IFFT procedure applied by an IFFT processing block 106. IFFT processing block 106 generates time domain output bursts from frequency domain input bursts.

According to the present invention, certain bursts may be special synchronization bursts generated by a synchronization burst generation system 108. As described below, these synchronization bursts have special frequency domain characteristics to facilitate receiver alignment to the transmitter's burst timing and carrier frequency.

The time domain burst output by IFFT processing block 106 is augmented with a cyclic prefix prior to transmission by a cyclic prefix addition block 110. The cyclic prefix addition process can be characterized by the expression:

$$[z(1) \ldots z(N)]^T \mapsto [z(N-v+1) \ldots z(N)\, z(1) \ldots z(N)]^T$$

The cyclic prefix has length v where v is greater than or equal to a duration of the impulse response of the channel and assures orthogonality of the frequency domain subchannels. According to the present invention, a supplemental cyclic prefix having length L may be added by cyclic prefix addition block 110 to the end of the v-length cyclic prefix to facilitate receiver synchronization to transmitter burst timing and/or transmitter carrier frequency.

A digital filtering stage 112 rejects interpolation images if interpolation is used and attenuates spectral regrowth due to discontinuities at boundaries between OFDM bursts. A digital-to-analog conversion system 114 converts the digital baseband signal, whether complex or real, to analog. An IF processing stage 116 converts the analog signal to an intermediate frequency and performs further filtering. The IF signal is then upconverted to an RF transmission frequency by the operation of a mixer 118. The RF transmission frequency is set by a variable frequency oscillator 120 feeding mixer 118. An RF processing system 122 includes further amplification and/or filtering prior to transmission via a transmission antenna 124.

Figure 2:
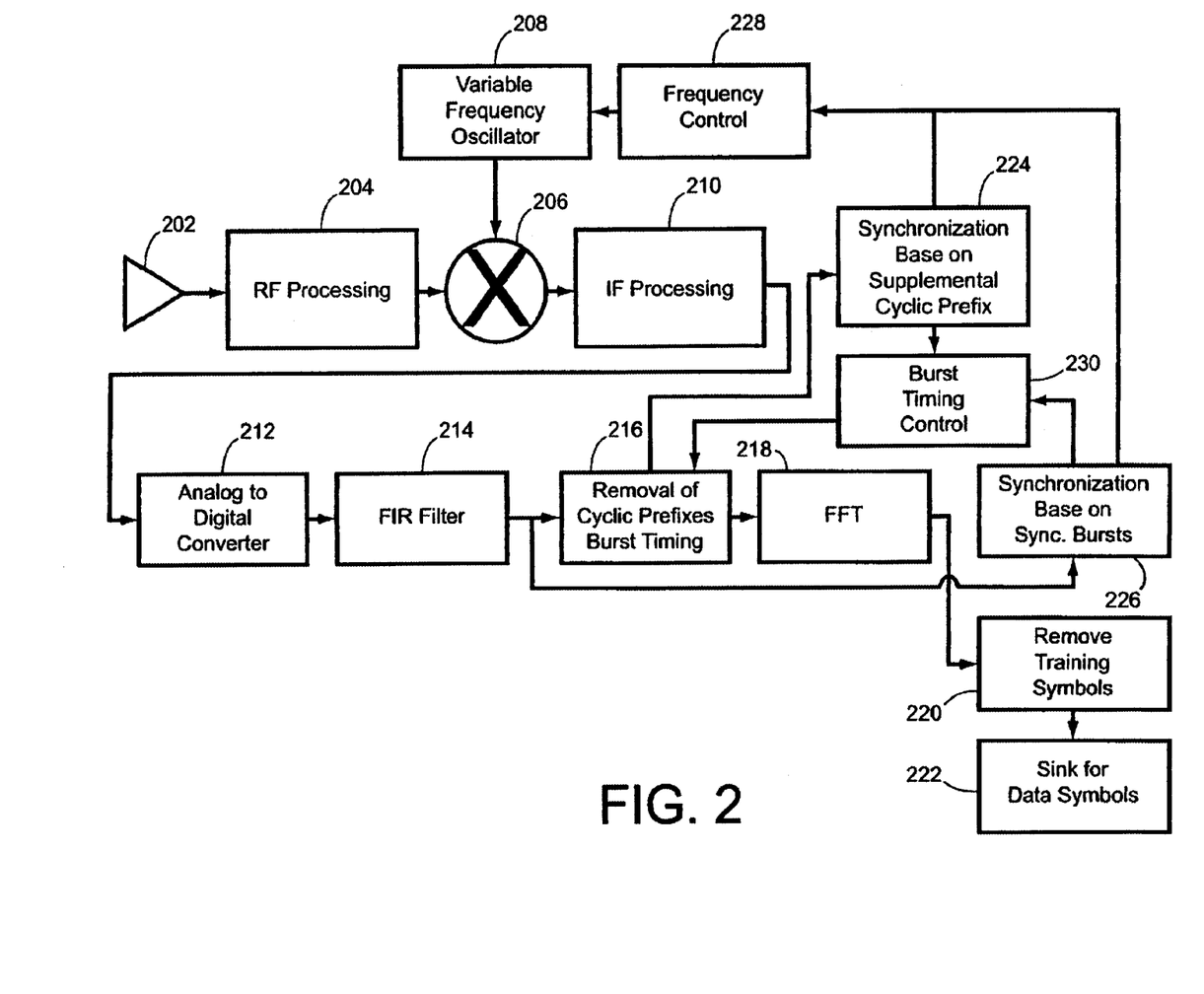
FIG. 2 depicts an OFDM receiver system according to one embodiment of the present invention.

FIG. 2 depicts an OFDM receiver system 200 according to one embodiment of the present invention. An RF antenna 202 receives an RF carrier modulated by a baseband OFDM signal. An RF processing stage 204 performs preamplification and filtering at the received frequency prior to downconversion to an intermediate frequency by a mixer 206. The carrier frequency received is determined by the frequency of a variable frequency oscillator 208. The IF output of mixer 206 is subject to further filtering and amplification within an IF processing stage 210. An analog to digital conversion system 212 converts the analog IF signal to a complex baseband digital signal. A digital filter 214 rejects any decimation images and out-of-band interference.

The output of digital filter 214 is a series of time domain symbol bursts. A cyclic prefix removal stage 216 determines the boundaries between bursts and removes both the v-length cyclic prefix and the supplemental cyclic prefix if one is used for synchronization. The remaining symbols are converted to the frequency domain by an FFT processing block 218. A training symbol removal block 220 removes training symbols injected for channel estimation purposes. The remaining data symbols are forward to a data symbol sink 222.

A first synchronization system 224 may perform burst and/or frequency synchronization based on the use of a supplemental cyclic prefix. A second synchronization system 226 may perform burst and/or frequency synchronization based on the use of special synchronization bursts. Although both systems are depicted, a particular implementation may use one or another or combine functions of both to accomplish frequency and burst synchronization.

Either of the two synchronization systems may provide input to a frequency control block 228 which controls reception frequency by varying the output frequency of variable frequency oscillator 208. In one embodiment, a frequency lock loop (FLL) exists whereby receiver variable frequency oscillator 208 of a first transceiver acts as a slave and locks to transmitter variable frequency oscillator 118 of a second transceiver which acts as the master. Also, the FLL may be used to lock the transmitter variable frequency oscillator 118 of the first transceiver to the transmitter variable frequency oscillator of the second transceiver, allowing a single timing source to control both transmission and reception at the second transceiver. Also, either of the two synchronization systems may provide input to a burst timing control system 230 which controls the determination of inter-burst boundaries within cyclic prefix removal stage 216.

The above-described transmitter system is merely representative. For example, selection of transmission frequency may occur in some other way rather than the operation of transmitter variable frequency oscillator 120 and receiver variable frequency oscillator 208. Furthermore, the overall communication system may be a wireline system rather than a wireless system so some other transmission medium input and output may substitute for the depicted antennas.

Also, the present invention may operate in the context of a system that exploits multiple transmission antennas, multiple reception antennas, spatial diversity, and/or spatial processing as described in e.g., PCT Publication No. WO 98/09385, the contents of which are herein incorporated by reference. Many of the techniques presented herein will be presented in the context of a receiver system employing multiple reception antennas where elements 202, 204, 206, 210, 212, 214, 216, 218, and 220 are duplicated for each receiver antenna employed. First synchronization system 224, second synchronization system 226, receiver variable frequency oscillator 208, frequency control block 228, and/or burst timing control system 230 may be common to all of a set of multiple reception antennas.

Synchronization Overview

According to the present invention, techniques are provided for both frequency synchronization and burst synchronization. In one embodiment, the synchronization functions operate without any knowledge of the particular channel in which data is being transmitted.

There are typically two synchronization modes: acquisition and tracking. Acquisition mode refers to establishment of the link between transmitter system 100 and receiver system 200. Both burst timing and frequency offset are typically required in acquisition. Furthermore, in one embodiment, the cyclic prefix parameter, v is also initially unknown at the receiver. After the burst timing and frequency offset are acquired, they are maintained in tracking mode. In tracking mode, correct burst timing and/or frequency offset are periodically or continuously re-estimated.

It is desirable that there be a large frequency acquisition range, e.g., 8 OFDM bins of frequency so that requirements for oscillator accuracy are reduced. During tracking, however, the offset error should be maintained to within +/−1% of an OFDM bin to minimize errors in recovering symbols.

In the description that follows, the structure of a special synchronization burst is described first. Then the use of a synchronization burst to acquire burst timing and frequency offset is described. Another synchronization technique depends on the use of a supplemental cyclic prefix. The contents of this supplemental cyclic prefix within a data burst will be presented followed by a technique for using the supplemental cyclic prefix to acquire burst timing and frequency offset. Then a technique for tracking burst timing and frequency offset using the supplemental cyclic prefix will be described. Finally a technique will be described for refining the selection of optimal burst timing where the channel impulse response duration may vary in length.

Synchronization Burst: Content and Use for Acquisition

Acquisitions may be performed through the use of synchronization OFDM bursts. In one embodiment, one synchronization bursts is employed in every transmission frame of 32 bursts.

Figure 3:
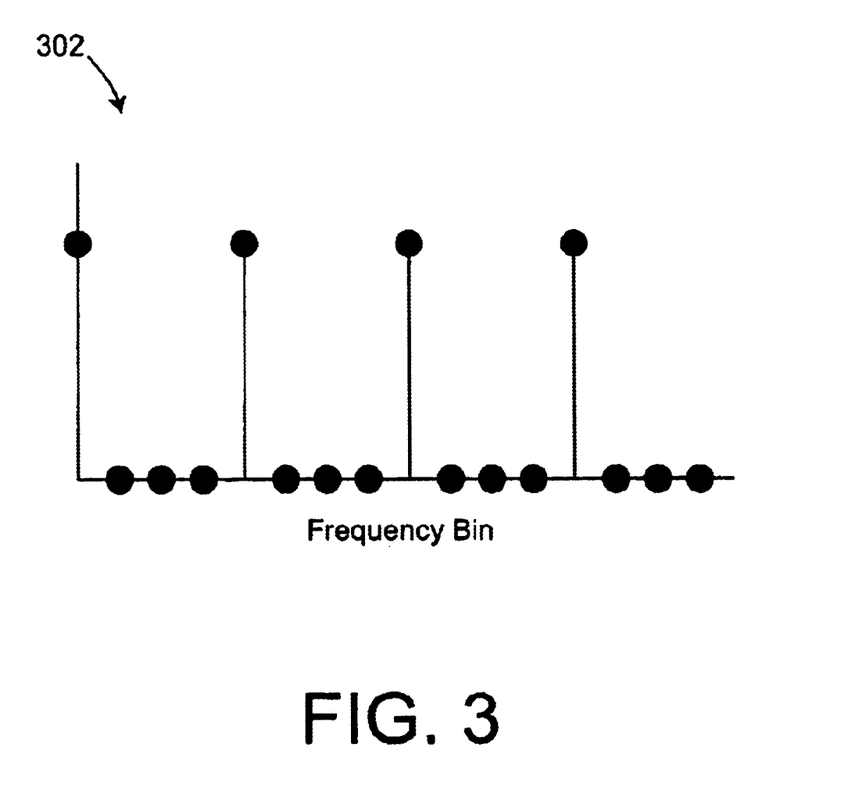
FIG. 3 depicts a null tone pattern in a synchronization burst according to one embodiment of the present invention.

FIG. 3 depicts a null tone pattern in a synchronization burst 302 according to one embodiment of the present invention. The pattern is depicted in the frequency domain. The synchronization bursts include zero energy frequency domain symbols except for M symbols, equally spaced, beginning in frequency bin n=0. The synchronization tone spacing NIM is chosen to provide a sufficiently large frequency offset acquisition range where N is the length of the IFFT/FFT pair. Here N/M=4. This frequency domain structure insures that received, time-domain samples repeat every M samples within each OFDM burst, regardless of the channel. Note, however, that the received data is typically not periodic within other bursts. The non-zero symbols within the synchronization burst typically have energy such that the synchronization burst has average energy equal to a data burst.

Second synchronization system 226 determines burst timing and frequency offset using the synchronization bursts. There are two cost functions that are employed:

The frequency cost function is given by:

$$d(\delta) = \sum_{i}^{M_R} \sum_{k=\delta}^{\delta+N-M-1} x_i(k)^* x_i(k+M).$$

where δ represents a particular burst timing alignment, i is an index to multiple receiver antennas, $M_R$ is the number of receiver antennas, $x_i(k)$ is the time domain received data for antenna i at time index k, N is the FFT/IFFT length, and M is the number of frequency domain synchronization symbols used in the burst. It should be noted that d may be found recursively. Preferably, this cost function should be smoothed with a forward/backward FIR filter given by:

$$\bar{d}(\delta) = \sum_{k=\delta-1}^{\delta+1} d(k).$$

Also, this cost function may be averaged every, e.g., 32 bursts.

The burst timing alignment cost function is given by:

$$c(\delta) = \sum_{i}^{M_R} \sum_{k=\delta}^{\delta+N-M-1} |x_i(k)|^2 + |x_i(k+M)|^2 - 2\left|\sum_{i}^{M_R} \sum_{k=\delta}^{\delta+N-M-1} x_i(k)^* x_i(k+M)\right|$$

This function can also be calculated recursively and should preferably also be smoothed with a forward/backward FIR. The burst timing alignment cost function may also be averaged every, e.g., 32 bursts.

Figure 4:
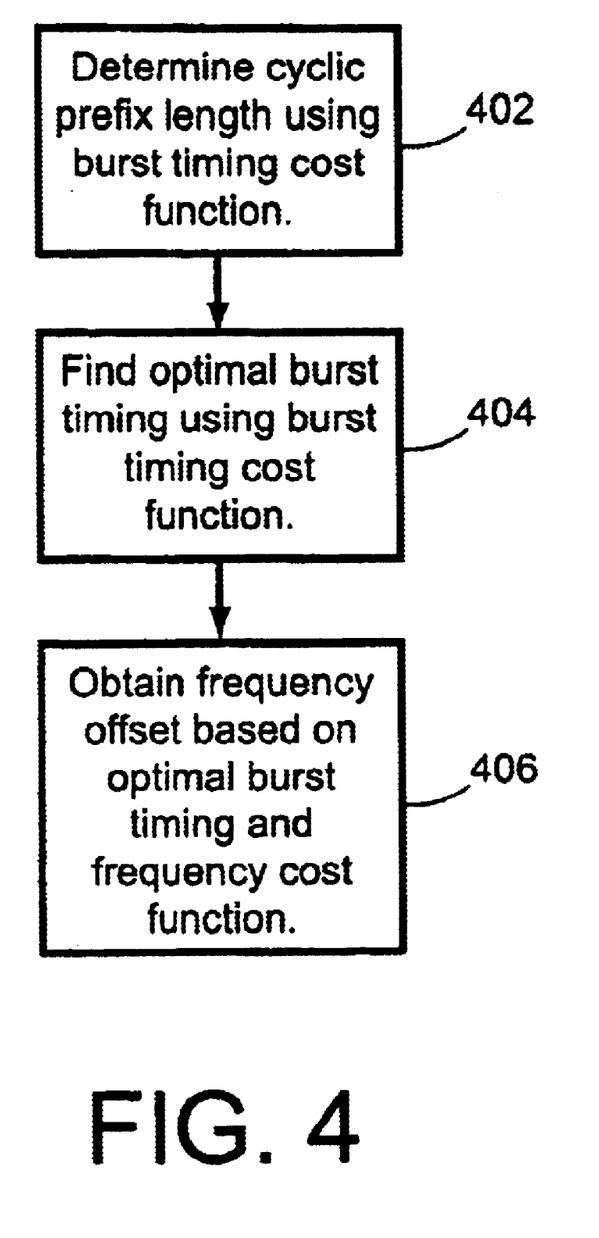
FIG. 4 is a flowchart describing steps of acquiring burst timing and frequency offset based on the synchronization burst of FIG. 3 according to one embodiment of the present invention.

FIG. 4 is a flowchart describing steps of acquiring burst timing and frequency offset based on the synchronization burst of FIG. 3 according to one embodiment of the present invention. The burst timing cost function is recursively calculated for using the time-domain received samples. Every, e.g., 32 bursts, a minimum is found for the burst timing function. These minima identify the beginning of a synchronization burst. The number of samples between synchronization bursts will be equal to 32(N+v), or 32(N+v+L) if a supplemental cyclic prefix is included. Since N and L are typically fixed by system design, second synchronization system 226 can solve for v at step 402. At step 404 second synchronization system 226 then finds the optimal burst timing, $\delta^{opt}$, to be the one that gives the minimum value for the burst timing cost function.

At step 406, the frequency offset is then found to be:

$$f_{offset} = \frac{1}{2\pi M} \tan^{-1} \frac{\operatorname{Im} \bar{d}(\delta^{opt})}{\operatorname{Re} \bar{d}(\delta^{opt})}$$

The non-zero frequency domain symbols of the synchronization bursts may carry training information or system configuration data. If M>v where v is the impulse response duration of the channel, v of the non-zero frequency domain symbols will preferably be used for training and the remaining frequency domain symbols may be used for data. Training procedures are discussed in U.S. application Ser. No. 09/234,929, filed on Jan. 21, 1999, entitled IMPROVED OFDM CHANNEL IDENTIFICATION, the contents of which are herein incorporated by reference. If M<v, all non-zero frequency domain symbols are used for training. The training symbols may, however, carry data in the form of phase differences between corresponding training symbols of successive bursts. In one embodiment, a constant phase difference between sets of training symbols in successive bursts may identify to the receiver the particular set of training symbols that are now being used.

Supplemental Cyclic Prefix Structure

Figure 5:
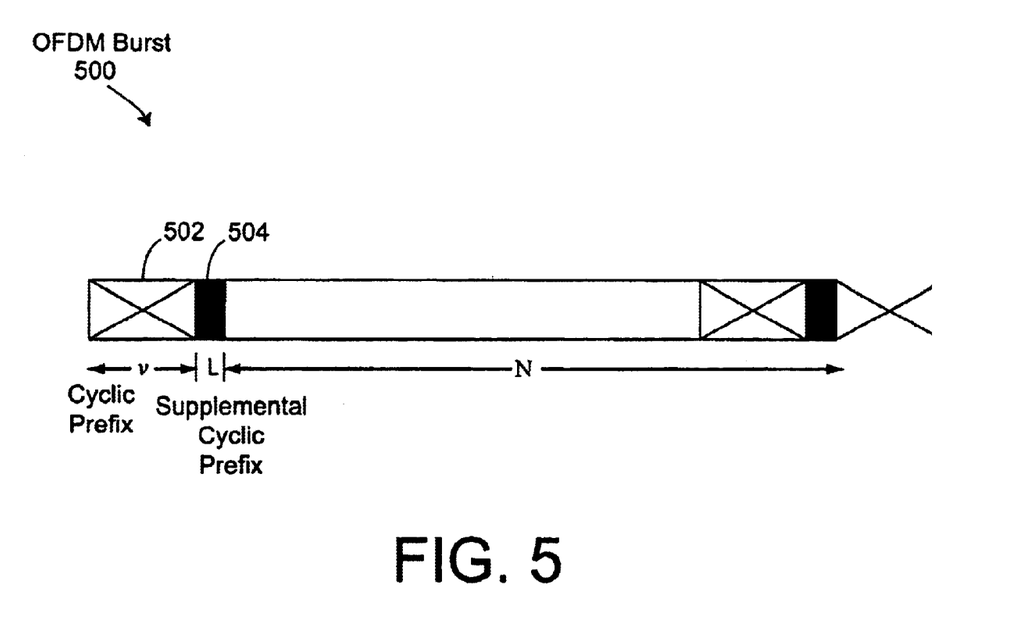
FIG. 5 is a diagram of an OFDM data burst having a supplemental cyclic prefix appended according to one embodiment of the present invention.

FIG. 5 is a diagram of an OFDM burst 500 according to one embodiment of the present invention. OFDM burst 500, as depicted in the time domain, includes a v length cyclic prefix 502 and a supplemental cyclic prefix 504 having length L. Together, v length cyclic prefix 502 and supplemental cyclic prefix 504 duplicate the last v+L of N time domain symbols. The v length cyclic prefix 500 assures orthogonality of the frequency domain subchannels as discussed above. Supplemental cyclic prefix 504 is used for synchronization purposes and is positioned after the v-length cyclic prefix so as to be protected from the effects of a time dispersive channel on the previous time domain burst. An alternative burst structure using a supplemental cyclic prefix for burst timing is described in the co-filed application entitled ENHANCED SYNCHRONIZATION BURST FOR OFDM SYSTEMS.

Use of Supplemental Cyclic Prefix for Acquisition

Figure 6:
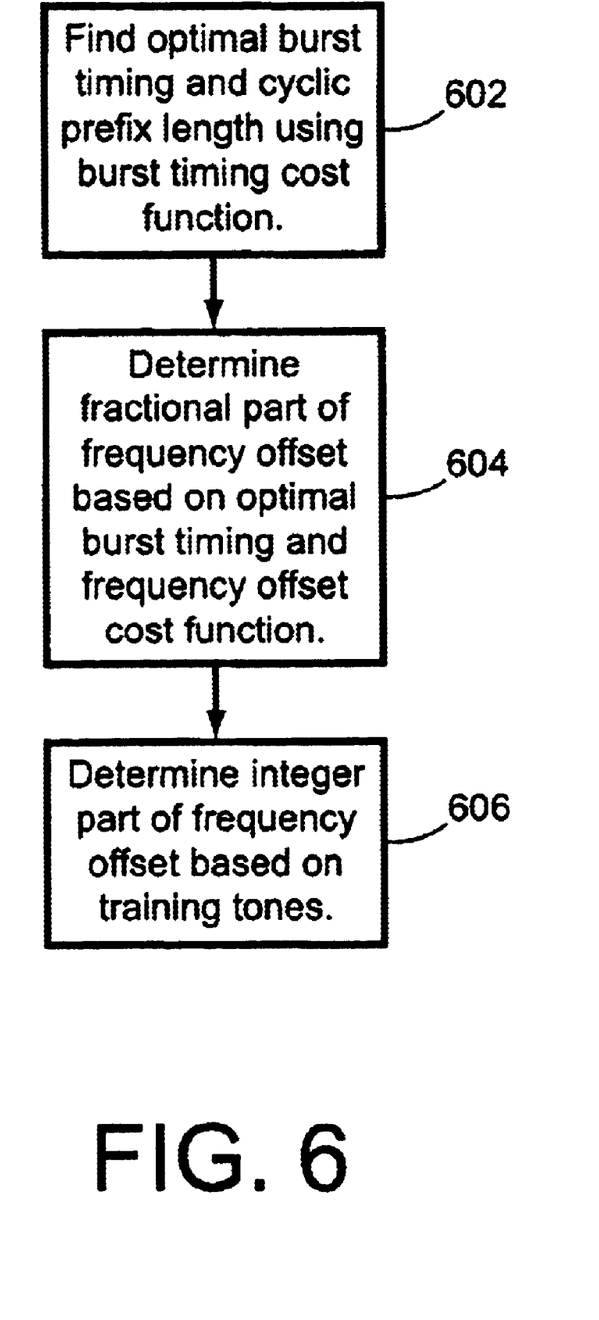
FIG. 6 is a flowchart describing steps of acquiring burst timing and frequency offset timing based on the structure of the OFDM data burst of FIG. 5 according to one embodiment of the present invention.

FIG. 6 is a flowchart describing steps of acquiring burst timing and frequency offset timing based on the structure of the OFDM data burst of FIG. 5 according to one embodiment of the present invention. At step 602, burst timing and the cyclic prefix length v are determined based on a burst timing cost function:

$$c(\delta) = \sum_{i}^{M_R} \sum_{k=\delta-L+1}^{\delta} |x_i(k)|^2 + |x_i(k+N)|^2 - 2\left|\sum_{i}^{M_R} \sum_{k=\delta-L+1}^{\delta} x_i(k)^* x_i(k+N)\right|.$$

This burst timing cost function may be computed recursively:

$$cp(\delta) = cp(\delta-1) + p(\delta) + p(\delta+N) - p(\delta-1) - p(\delta+N-1)$$

$$c(\delta) = cp(\delta) - 2|d(\delta)|$$

where $d(\delta)$ is the frequency offset function defined below and where $$p(k) = \sum_{i}^{M_R} |x_i(k)|^2,$$

a power measurement also usable for automatic gain control purposes.

The burst timing cost function is at a minimum where a block of data of length L repeats after an interval N, indicating repetition of the supplemental cyclic prefix. The cost function will repeat every N+v+L samples. Since L is known and the value of N is known, this fact is used to determine the value of v. For each possible value of the cyclic prefix $v_j$, calculate the burst-averaged timing cost function:

$$\bar{c}_j(\delta) = \sum_{k=0}^{31} c(\delta + k(N+v_j+L)), \forall \delta \in [0, N+v_j+L-1].$$

Whichever cost value, $\bar{c}_j$, has the smallest minima determines the value of v.

The value of $\delta$ that corresponds to the minimum value of $\bar{c}_j$ is the burst timing value, $\delta^{opt}$. Before finding $\delta^{opt}$, however, the burst-averaged timing cost function may be smoothed with forward/backward FIR filter (I=4), $$\bar{c}_j(\delta) = \sum_{k=\delta-1}^{\delta+1} \bar{c}_j(k)$$

The frequency offset can be understood to be an integer number of OFDM bins plus a fractional part of an OFDM bin:

$$f_{offset} = f_{int} + \Delta f_{offset}$$

At step 604, the fractional part of the frequency offset is determined with the frequency offset cost function:

$$d(\delta) = \sum_{i}^{M_R} \sum_{k=\delta-L+1}^{\delta} x_i(k)^* x_i(k+N).$$

Note that d can be found recursively, $$d(\delta) = d(\delta-1) + \sum_{i}^{M_R} x_i(\delta)^* x_i(\delta+N) - \sum_{i}^{M_R} x_i(\delta-L)^* x_i(\delta-L+N),$$

and is a component of the timing cost function.

As with the timing cost function, d repeats every N+v+L samples. The burst-averaged frequency offset cost must be determined for the correct value of v:

$$\bar{d}(\delta) = \sum_{k=0}^{31} d(\delta + k(N+v+L)), \forall \delta \in [0, N+v+L-1].$$

Then, the fractional frequency offset is given by $$\Delta f_{offset} = \frac{1}{2\pi N} \tan^{-1} \frac{\operatorname{Im}\bar{d}(\delta^{opt})}{\operatorname{Re}\bar{d}(\delta^{opt})}.$$

where $\delta^{opt}$ is the minimizing value of the timing cost function.

Once the $\Delta f_{offset}$ has been determined, variable frequency oscillator 208 is driven to a new frequency. Continued updates to frequency offset and burst timing are done with the timing and frequency offset functions. After the FLL has converged, OFDM bursts of data are converted to the frequency domain through the N-point FFT.

Determination of the integer portion of frequency offset at step 606 is based on the repetition of frequency domain training symbols at the same positions in successive bursts. Let $X_i(n, k)$ be the received frequency domain value at tone n, burst k and antenna i. The integer component of the frequency offset is determined by calculating 1+N/v costs, $d_j$. This is done with for all n, $$Y(n) = \sum_{i=1}^{M_R} \sum_{k=1}^{K} X_i^*(n, k) X_i(n+k+2)$$

for 1+N/v sets of frequencies, $$d_j = \sum_{n \in J_j} Y(n) j \in \{-4, 4\}$$

where K may be as small as 1 and $J_j$ are a set of v frequency indices, equally spaced by N/v:

$$J_j = \left[ j \;\; j + \frac{N}{v} \ldots \right]$$

The values for $d_j$ are complex. The integer component of the frequency offset is determined based on the largest $d_j$:

$$f_{int} = \arg\max_j |d_j|^2$$

as expressed in bin widths.

Use of Supplemental Prefix for Tracking

Figure 7:
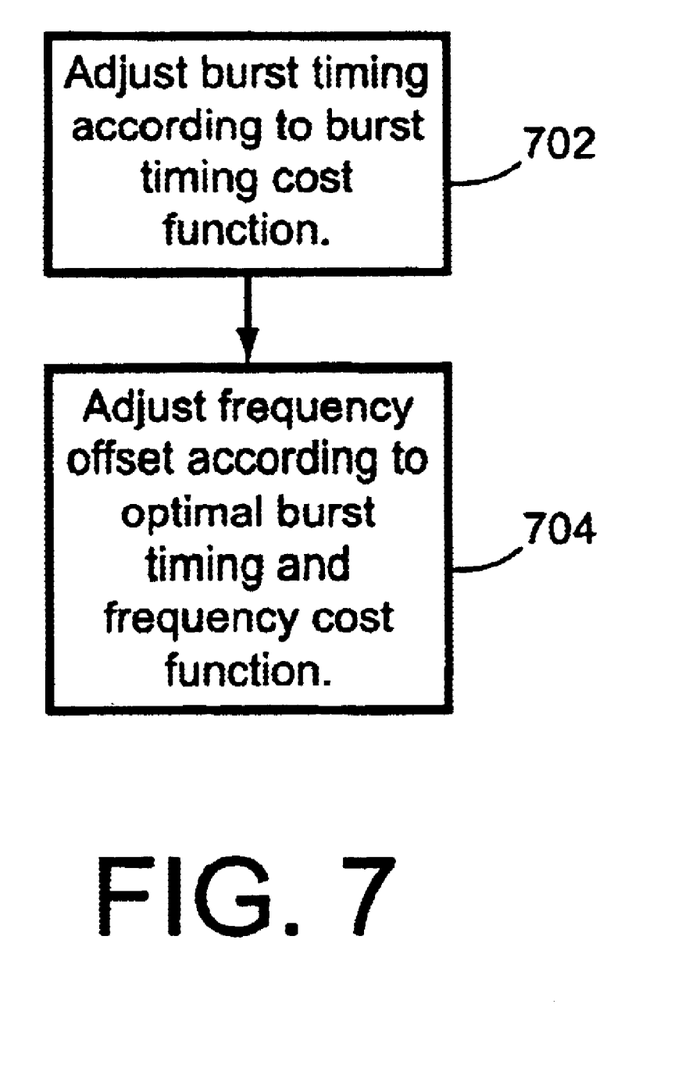
FIG. 7 is a flowchart describing steps of tracking burst timing and frequency offset timing based on the structure of the OFDM data burst of FIG. 5 according to one embodiment of the present invention.

FIG. 7 is a flowchart describing steps of tracking burst timing and frequency offset timing based on the structure of the OFDM data burst of FIG. 5 according to one embodiment of the present invention. In tracking mode, the supplemental cyclic prefix, may be used for burst timing and frequency offset estimate updates. In a preferred embodiment, it can be assumed that during tracking mode the sample clock does not slide more than one sample clock interval in a frame of successively transmitted OFDM bursts, although this is not essential for tracking. Furthermore, it is assumed that the frequency offset contained within plus-or-minus ½ OFDM bin. Hence, $f_{int}=0$ and $f_{offset}=\Delta f_{offset}$. Given these constraints, the timing and frequency cost values need only be determined within a small interval around the current timing estimate, $\delta \in \kappa$. The cost functions should at a minimum be determined for a window that is slightly larger than the cyclic prefix.

The tracking mode burst timing and frequency offset cost functions are the same as the acquisition ones above that take advantage of the cyclic prefix.

As in acquisition mode, both the timing and frequency offset cost functions should preferably be averaged across a number of OFDM bursts determined according the amount of noise in the system. In one embodiment, the cost functions are averaged across 32 bursts. Hence, the average cost function over 32 burst period is given by, where $$\bar{c}(\delta) = \sum_{k=1}^{32} c(k, \delta), \forall \delta \in \kappa$$

where $c(k,\delta)$ is the timing cost function for burst k. In the same way, $$\bar{d}(\delta) = \sum_{k=1}^{32} d(k, \delta), \forall \delta$$

where $d(k,\delta)$ is the frequency offset cost function for burst k.

As in acquisition, the timing cost function should be forward/backward smoothed with an FIR. The minimum of $\bar{c}(\delta)$ has a timing estimate $\delta^{opt}$. This new timing estimate may be exponentially averaged with past estimates to produce a smoothly varying timing value to use for control of burst timing at step 702. The frequency offset may be exponentially averaged with past estimates to produce a smoothly varying timing value to control frequency at step 704. The frequency offset is again given by:

$$\Delta f_{offset} = \frac{1}{2\pi N} \tan^{-1} \frac{\operatorname{Im} \bar{d}(\delta^{opt})}{\operatorname{Re} \bar{d}(\delta^{opt})}.$$

Refinement to Optimizing Burst Timing Cost Function Based on Supplemental Cyclic Prefix Where the burst timing cost function is based on the supplemental cyclic prefix, the optimal burst timing may vary within a range depending on the duration of the channel impulse response. For channels having impulse responses shorter than v, there will be range of timings for which the cost function will be at a minimum or near minimum. This is because symbols at the end of the v-length cyclic prefix will be as protected from corruption from the previous burst as symbols with in the L-length supplemental cyclic prefix and thus will correlate well with symbols more than L before the end of the current burst. This range of possible optimal burst timings need not be a problem because for timings that determine the beginning of the N time domain symbols too early, the symbols added at the beginning are uncorrupted and identical to the ones lost at the end. The operation of OFDM will be insensitive to this timing slip and thus each recovered frequency domain symbol will remain independent of other symbols.

It may however, be desirable to select the optimal burst timing that would be found for a v-length channel even if the actual channel impulse response duration is shorter. For example, in a mobile application, channel impulse response duration may vary and even if the channel impulse response has a short duration at one time, it may quickly lengthen making a burst timing that was once optimal no longer acceptable. To address this problem, one embodiment of the present invention provides a system and method for determining the optimal burst timing that would be found for a v-length channel even if the current impulse response is shorter.

Figure 8:
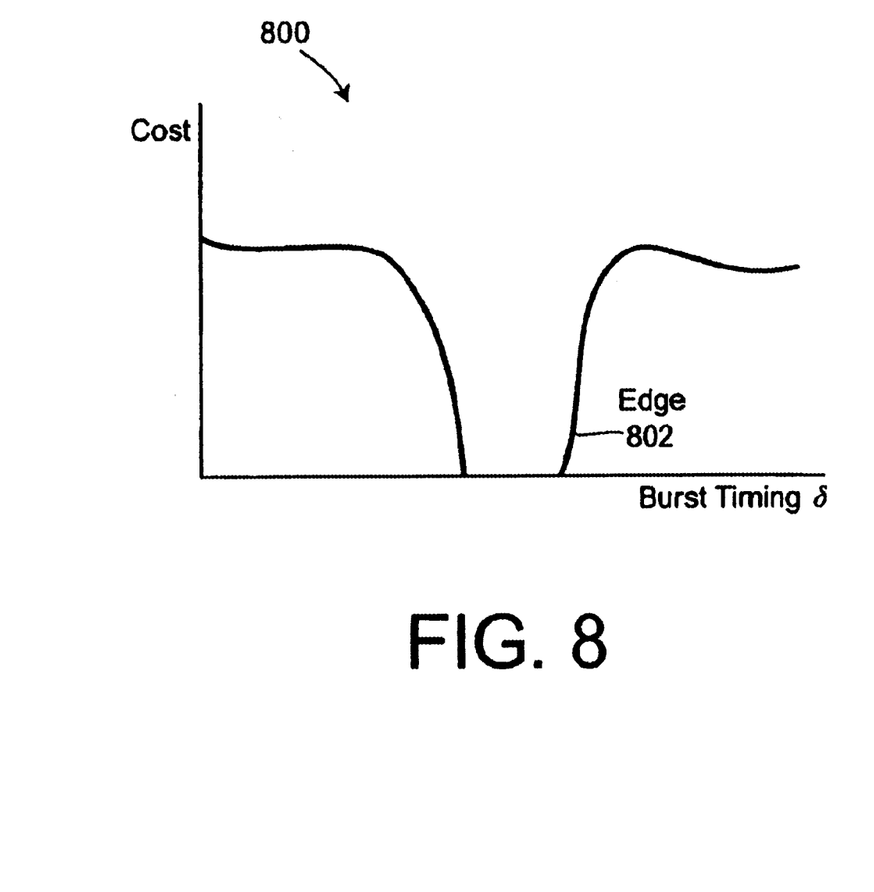
FIG. 8 depicts a graph of a cost function for acquiring burst timing according to one embodiment of the present invention.

FIG. 8 depicts a graph 800 of a cost function for burst timing where the channel has an impulse response shorter than v and there are therefore a range of optimal burst timings. In certain applications, it would be desirable to select the burst timing that corresponds to a right edge 802 of the range of optimal burst timings.

Edge 802 is defined to be the value of the cost function as $\delta$ progresses from the optimal value at the beginning of the N-interval into the N-interval. The shape of the expected cost function is $$Ec_p(\delta) = 2l\sigma_v^2 + \frac{2\sigma_x^2}{v}a(\delta)$$

where $\sigma_v^2$ is the additive noise variance, $\sigma_x^2$ is the variance of the noise-free received samples, and $$a(\delta) = \begin{cases} 0 \text{ for } \delta < \delta_b \\ \sum_{k=0}^{\delta-\delta_b} k \text{ for } \delta \geq \delta_b \end{cases}$$

Let $$a = \begin{bmatrix} 0 & 1 & 3 & 6 & \cdots & \sum_{k=0}^{L-1} k \end{bmatrix}^T$$

$$c(\delta) = [c_p(\delta) \ldots c_p(\delta+L-1)]^T.$$

To find the edge, $\delta_b$ is determined by $$\delta_b = \operatorname*{argmin}_{\delta,x} \|c(\delta) - ax\|_2^2$$

$$= \operatorname*{argmin}_{\delta} c(\delta)^T c(\delta) - \frac{|c(\delta)^T a|^2}{a^T a}$$

$$= \operatorname*{argmax}_{\delta} \frac{|c(\delta)^T a|^2}{|a|^2 \|c(\delta)\|^2}$$

Note for the purposes of recursive implementations that:

$$|c(\delta+1)|^2 = |c(\delta)|^2 + c_p(\delta+L)^T c_p(\delta+L) - c_p(\delta)^T c_p(\delta).$$

CONCLUSION

While the above is a complete description of preferred embodiments of the invention, there is alternatives, modifications, and equivalents may be used. It should be evident that the invention is equally applicable by making appropriate modifications to the embodiments described above. For example, in a system that employs both synchronization bursts and a supplemental cyclic prefix, the receiver may utilize the synchronization bursts for the frequency cost function and the supplemental cyclic prefix for the burst timing cost function, or vice versa. Also, according to the present invention, synchronization bursts may be used for tracking. Therefore, the above description should not be taken as limiting the scope of the invention that is defined by the metes and bounds of the appended claims along with their full scope of equivalents.

What is claimed:

1. A method for transmitting an OFDM signal via a channel to facilitate receiver synchronization comprising:

transforming a series of frequency domain data symbols into a burst of time domain symbols;

appending to a beginning of said time domain burst a cyclic prefix duplicating a last segment of said time domain burst, wherein said cyclic prefix includes a first portion having length v wherein v is greater than or equal to an impulse response of said channel; and further includes a second portion after said first portion to facilitate receiver synchronization; and transmitting said time domain burst with said appended cyclic prefix.

2. A method for synchronizing to an OFDM signal received via a channel, said method comprising:

receiving successive OFDM bursts wherein each of said successive OFDM bursts includes in the time domain, a series of N time domain symbols, a cyclic prefix duplicating a last segment of said series of N time domain symbols, wherein said cyclic prefix includes a first portion having length v wherein v is greater than or equal to an impulse response of said channel; and further includes a second portion after said first portion to facilitate receiver synchronization;

evaluating a first cost function over said successive OFDM bursts that varies depending on receiver burst timing alignment to said successive OFDM bursts; and setting said burst timing alignment to optimize said first cost function, thereby synchronizing receiver burst timing to transmitter burst timing.

3. The method of claim 2 wherein said first cost function evaluates degree of match between said second portion of cyclic prefix and a corresponding portion of said N time domain symbols.

4. The method of claim 2 wherein said length v is initially unknown, said first cost function varies depending on said length v and said setting step further varies said length v of said cyclic prefix to optimize said first cost function.

5. The method of claim 2 wherein setting comprises:

determining an optimal burst timing that will be optimal for all channel impulse response durations up to v.

6. The method of claim 2 further comprising:

determining a fractional component of a receiver frequency alignment as measured in a unit defined by spectral width of a single OFDM frequency domain symbol based on said burst timing alignment as varied to optimize said first cost function and on a second cost function that varies according to frequency alignment.

7. The method of claim 6 wherein each of said successive OFDM bursts include frequency domain training symbols at predetermined positions and having predetermined values; and further comprising:

setting an integer component of said receiver frequency alignment so that said frequency domain training symbols are received at their predetermined positions.

8. A system for transmitting an OFDM signal via a channel to facilitate receiver synchronization comprising:

a transforming stage that transforms a series of frequency domain data symbols into a burst of time domain symbols; and a cyclic prefix appending stage that appends to a beginning of said burst of time domain symbols, a cyclic prefix duplicating a last segment of said burst of time domain symbols, wherein said cyclic prefix includes a first portion having length v wherein v is greater than or equal to an impulse response of said channel; and further includes a second portion after said first portion to facilitate receiver synchronization.

9. The system of claim 8 further comprising:

a transmission stage that transmits said burst of time domain symbols with said appended cyclic prefix.

10. A system for processing an OFDM signal received via a channel, said system comprising:

an OFDM reception system that receives successive OFDM bursts wherein each of said successive OFDM bursts includes in the time domain, a series of N time domain symbols, a cyclic prefix duplicating a last segment of said series of N time domain symbols, wherein said cyclic prefix includes a first portion having length v wherein v is greater than or equal to an impulse response of said channel; and further includes a second portion after said first portion to facilitate receiver synchronization; and a synchronization block that evaluates a first cost function over said successive OFDM bursts that varies depending on receiver burst timing alignment to said successive OFDM bursts; and that sets said burst timing alignment to optimize said first cost function, thereby synchronizing receiver burst timing to transmitter burst timing.

11. The system of claim 10 wherein said first cost function evaluates degree of match between said second portion of said cyclic prefix and a corresponding portion of said N time domain symbols.

12. The system of claim 10 wherein said first portion of said cyclic prefix has initially unknown length, said first cost function varies depending on said length and said synchronization system further varies said cyclic prefix length to optimize said first cost function.

13. The system of claim 10 wherein said synchronization block determines optimal burst timing that will be optimal for all channel impulse response durations up to said length v of said first portion of said cyclic prefix.

14. The system of claim 10 wherein said synchronization block determines a fractional component of a receiver frequency alignment as measured in a unit defined by spectral width of a single OFDM frequency domain symbol based on said burst timing alignment as varied to optimize said first cost function and on a second cost function that varies according to frequency alignment.

15. The system of claim 14 wherein each of said OFDM bursts include frequency domain training symbols at predetermined positions and having predetermined values; and wherein said synchronization block sets an integer component of said receiver frequency alignment so that said frequency domain training symbols are received at their predetermined positions.

16. Apparatus for transmitting an OFDM signal via a channel to facilitate receiver synchronization comprising:

means for transforming a series of frequency domain data symbols into a burst of time domain symbols;

means for appending to a beginning of said time domain burst a cyclic prefix duplicating a last segment of said time domain burst, wherein said cyclic prefix includes a first portion having length v wherein v is greater than or equal to an impulse response of said channel; and further includes a second portion after said first portion to facilitate receiver synchronization; and     means for transmitting said time domain burst with said appended cyclic prefix.

17. Apparatus for synchronizing to an OFDM signal received via a channel, said apparatus comprising:

means for receiving successive OFDM bursts wherein each of said successive OFDM bursts includes in the time domain, a series of N time domain symbols, a cyclic prefix duplicating a last segment of said series of N time domain symbols, wherein said cyclic prefix includes a first portion having length v wherein v is greater than or equal to an impulse response of said channel; and further includes a second portion after said first portion to facilitate receiver synchronization;

means for evaluating a first cost function over said successive OFDM bursts that varies depending on receiver burst timing alignment to said successive OFDM bursts; and     means for setting said burst timing alignment to optimize said first cost function, thereby synchronizing receiver burst timing to transmitter burst timing.

* * * * *

UNITED STATES PATENT AND TRADEMARK OFFICE
CERTIFICATE OF CORRECTION

PATENT NO. : 6,876,675 B1
DATED : April 5, 2005
INVENTOR(S) : Jones IV et al.

It is certified that error appears in the above-identified patent and that said Letters Patent is hereby corrected as shown below:

Column 5,
Line 42, kindly change "NIM" to -- N/M --.

Column 6,
Line 43, kindly change "vis" to -- v is --.

Signed and Sealed this

Fourteenth Day of June, 2005

JON W. DUDAS
*Director of the United States Patent and Trademark Office*